United States Patent
Goncalves et al.

(10) Patent No.: US 10,552,699 B2
(45) Date of Patent: Feb. 4, 2020

(54) ROBUST STRING TEXT DETECTION FOR INDUSTRIAL OPTICAL CHARACTER RECOGNITION

(71) Applicant: Datalogic USA, Inc., Eugene, OR (US)

(72) Inventors: Luis Goncalves, Pasadena, CA (US); Filippo Mambelli, Glendale, CA (US); Flavio Poli, Cavalese (IT)

(73) Assignee: Datalogic USA, Inc., Eugene, OR (US)

( * ) Notice: Subject to any disclaimer, the term of this patent is extended or adjusted under 35 U.S.C. 154(b) by 212 days.

(21) Appl. No.: 15/854,976

(22) Filed: Dec. 27, 2017

(65) Prior Publication Data

US 2018/0181826 A1 Jun. 28, 2018

Related U.S. Application Data

(60) Provisional application No. 62/439,295, filed on Dec. 27, 2016.

(51) Int. Cl.
*G06K 9/18* (2006.01)
*H04N 1/00* (2006.01)

(52) U.S. Cl.
CPC ........... *G06K 9/18* (2013.01); *H04N 1/00795* (2013.01); *H04N 2201/0081* (2013.01)

(58) Field of Classification Search
CPC ........... G06K 9/01; G06K 9/18; G06K 9/344; G06K 9/3283; H04N 1/00795; H04N 2201/0081; H03M 7/3086
USPC ........................................................ 382/229
See application file for complete search history.

(56) References Cited

U.S. PATENT DOCUMENTS

| | | | |
|---|---|---|---|
| 5,251,268 A | 10/1993 | Colley et al. | |
| 5,321,770 A | 6/1994 | Huttenlocher et al. | |
| 5,497,432 A * | 3/1996 | Nishida | G06K 9/344 382/178 |
| 5,771,011 A * | 6/1998 | Masenas | H03M 7/3086 341/50 |
| 6,628,808 B1 | 9/2003 | Bach et al. | |
| 7,047,238 B2 | 5/2006 | Tada et al. | |
| 8,370,143 B1 * | 2/2013 | Coker | G06F 17/276 704/240 |
| 8,726,148 B1 * | 5/2014 | Battilana | G06F 17/273 715/234 |

(Continued)

OTHER PUBLICATIONS

Kang et al., "Orientation Robust Text Line Detection in Natural Images", 2014 IEEE Conference on Computer Vision and Pattern Recognition, Open Access version, provided by the Computer Vision Foundation, 8 pages. http://openaccess.thecvf.com/content_cvpr_2014/papers/Kang_Orientation_Robust_Text_2014_CVPR_paper.pdf.

(Continued)

*Primary Examiner* — Ali Bayat
(74) *Attorney, Agent, or Firm* — Shook, Hardy & Bacon, L.L.P.

(57) ABSTRACT

A robust string text detection and recognition system is provided to improve the reading performance of sliding-window based OCR solutions (such as histogram of oriented gradient (HOG) OCR and convolutional neural network (CNN) OCR). A search algorithm is created that is robust enough to detect outliers and false detections. A general Text Search algorithm structure is created allows the specification of different constraints/assumptions to guide the search in multiple text lines detection and recognition.

20 Claims, 3 Drawing Sheets

(56) References Cited

U.S. PATENT DOCUMENTS

| | | | |
|---|---|---|---|
| 8,787,702 B1 | 7/2014 | Withers | |
| 9,311,176 B1* | 4/2016 | Khokhar | G06F 11/008 |
| 9,396,404 B2 | 7/2016 | Goncalves | |
| 2002/0102022 A1 | 8/2002 | Ma et al. | |
| 2007/0237401 A1 | 10/2007 | Coath et al. | |
| 2013/0181851 A1* | 7/2013 | Kataoka | H03M 5/02 |
| | | | 341/52 |
| 2013/0194448 A1 | 8/2013 | Baheti et al. | |
| 2015/0304510 A1 | 10/2015 | Matsutani | |
| 2016/0188541 A1 | 6/2016 | Chulinin | |
| 2016/0217123 A1 | 7/2016 | Chulinin et al. | |
| 2018/0225536 A1* | 8/2018 | Tonouchi | G06K 9/2081 |

OTHER PUBLICATIONS

Optical Character Recognition Technology; OCRMax, 2017, www.cognex.com, 2 pages Available at: http://www.cognext.com/ocr-optical-character-recognition.aspx OCR, HALCON the Power of Machine Vision, Quick Guide 7.1, Section 3.12, Apr. 2006, pp. 145-162. http://download.mvtec.com/halcon-7.1-quick-guide.pdf.

Jaderberg et al., "Deep Features for Text Spotting", 2014, 17 pages https://www.robots.ox.ac.uk/~vgg/publications/2014/Jaderberg14/jaderberg14.pdf.

International Search Report and Written Opinion dated Mar. 19, 2018 in International Patent Application No. PCT/US17/68560, 9 pages.

* cited by examiner

ROBUST STRING TEXT DETECTION FOR INDUSTRIAL OPTICAL CHARACTER RECOGNITION

CROSS-REFERENCE TO RELATED APPLICATIONS

This application claims priority to U.S. Application No. 62/439,295, filed Dec. 27, 2016, entitled "Robust String Text Detection For Industrial OCR", the entirety of which is incorporated herein by reference.

BACKGROUND OF THE INVENTION

There are two main optical character recognition (OCR) approaches:

1: line detection->character segmentation->character classification->string formation.

2: sliding window character detection/identification->line detection->string formation The 1st approach fails if line detection or character segmentation fails. Typically, segmentation is very difficult to do robustly, especially since we try to do segmentation before recognition (we don't take advantage about knowledge of the objects to recognize—we try to "detect" without "recognizing", which is hard).

The 2nd approach can be more robust because it avoids having to do a segmentation/detection. Instead we first find candidate recognitions of characters throughout the image, and then assemble the candidates into the most likely string(s). The main difficulty with this approach is that the character recognition may generate false positive detections which must be filtered out.

Most OCR approaches are based on an initial (character) segmentation.

SUMMARY

In this invention we propose an algorithm to robustly detect lines and assemble the most likely/probably string from the set of detected candidate characters.

Our approach avoids the segmentation step, and instead we start by producing a set of candidate detections found throughout the image, the so-called sliding-window approach.

The sliding window approach to recognition is not usual for OCR, but used for other recognition applications, such as pedestrian detection (ref). In that case, one still needs to worry about false positives and outliers, but there is no need to assemble individual detections into a final ensemble (a character string in our case).

Embodiments of the invention include an improved methodology for optical character recognition. A scanner, whether fixed or handheld, can detect characters or non-characters in order to find lines of characters. The lines of characters are split into words. Dynamic programming is used to find the most likely word from a lexicon given the strength of the character and bigram detections.

Particularly, a robust string text detection and recognition system is provided to improve the reading performance of sliding-window based OCR solutions (such as histogram of oriented gradient (HOG) OCR and convolutional neural network (CNN) OCR). A search algorithm is created that is robust enough to detect outliers and false detections. A general Text Search algorithm structure is created allows the specification of different constraints/assumptions to guide the search in multiple text lines detection and recognition.

In a first aspect, a device for performing optical character recognition is provided that includes an image scanner that scans an image. The image scanner performs the following functions. A line of text is identified from a list of peaks that represent a strong detection of characters. The peaks are candidate detections. A cluster of peaks is categorized into a cloud. The cluster of peaks is a subgroup of the peaks based on a position of the peaks. Multiple subgroups make up multiple clouds. For each cloud, a starting root is located that represents a strongest detection of possible characters. For each root, the root is set as the nth character in a string. A length of the string is used to find a number of clouds in the line. The image scanner finds a most likely word with the root at the nth character using a left and right tree search algorithm. From the n strings, the image scanner selects a best position of the root in the string based on a pre-determined constraint and selection criteria. The best position of the root is a best word. The image scanner selects the best word from a set of words generated from various starting roots.

BRIEF DESCRIPTION OF THE SEVERAL VIEWS OF THE DRAWINGS

Illustrative embodiments of the present invention are described in detail below with reference to the included drawing figures, wherein.

DETAILED DESCRIPTION OF THE INVENTION

Figure 1:
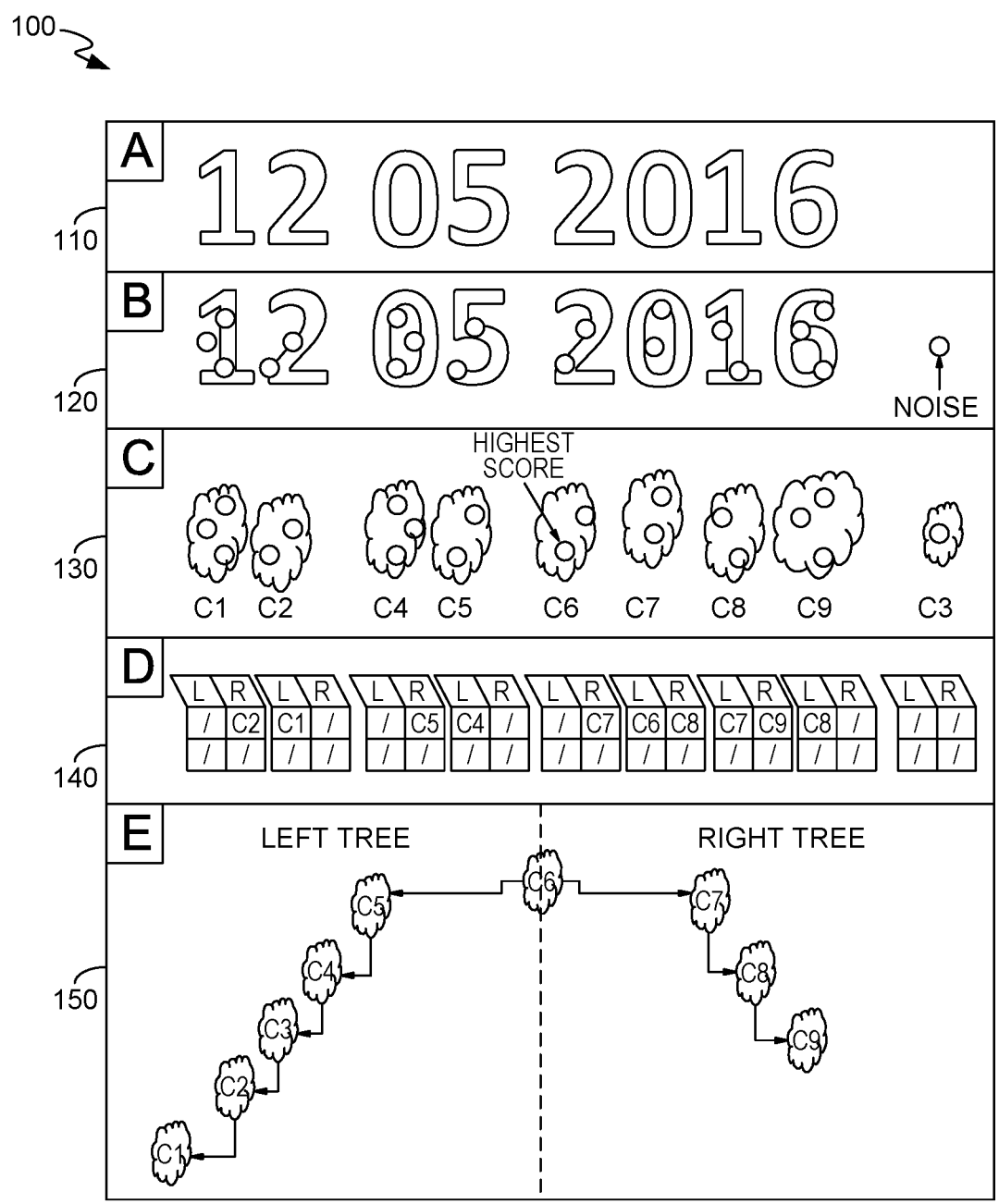
FIG. 1 is an illustration of an exemplary recognition mode, implemented in accordance with an embodiment of the present invention.

The first stage of the detection consists of the identification of the line of text given a list of local peaks that represents the strong local detection for each character. The detection of the angle and positions of each line is done by the analyses of the histogram of the projected peaks along a range of possible angles. Once the lines are detected, our approach tries to provide a method for robustly identifying the true detections from the set of candidate detections. This is done with a very lax model of character size and spacing, which can be called a layout model.

The main idea is to use a tree-search approach.

The assumption is that candidate detections appear in a cloud like conglomerations of peaks (all those peaks could potentially be good candidates for the recognition). All the peaks are clustered in clouds based on their positions.

Embodiments of the invention may be implemented in the following manner as a pseudo-code:

1—find line from set of candidate detections in image

2—for every line, find clouds of detections (which represent possible real characters)

3—for every cloud find a Starting Root (the strongest detection in the cloud)

4—for each root

5—consider the root as the n-th character in the string (length of the string to find or number of clouds in the line)

6—find the most likely word with root at n-th character using a left and right tree search algorithm 7—from the n strings, pick the best word (best position of root in string) based on some constraints and selection criteria 8—pick the best word overall, from the set of words generated considering the different starting roots.

The general tree-search structure consists of:
1. We pick the strongest detection for every cloud, and we name that subset of detection Starting Roots.
2. For each Starting Root we generate a set of hypotheses. Each hypothesis is a particular position in the layout model of the line (we generate only the feasible hypothesis i.e. if we are considering the first cloud on the left we only consider the first position). For each hypothesis we build two different trees—one that tries to build the string from given point to the right and the other from the given point to the left.
3. The generation of the tree is done in a depth-first manner, and consists in three functions: Expand, Explore and Rollback.
   (a) Expand identify the next set of clouds (one or more) based on the position assumed in the given hypothesis and the model of the layout of the line. Return the list of the detections for all the selected clouds.
   (b) Explore decide what is the next detection to expand at the next level of the tree. This function changes on the base of the set of constraints we apply to the algorithm (such as length of string, or particular date format).
   (c) Rollback if the exploration of the tree arrives to a result that is inconsistent with the hypothesis and the layout of the string (or we find a solution, but want to explore more), the tree creation backtracks to the best last open decision point.
4. Finalizing results: among all the different results from the various hypotheses, the best detection is returned based on compliance with constraints and the overall score of the result.

OCR industrial application can present multiple different use modes (we can work in Verification mode to verify that a given string is literally matched, we can work in Fielding mode where we have constraints on the possible characters at certain position in the string, or Recognition mode, where we have constraints based on the number of characters to read and the spacing between the characters).

Below are the description and the constraints for each mode:
1. Recognition mode:
   Spatial/Layout constraints: a given mean dimension of characters and the average spacing between characters. This information is retrieved during the training. Also, a minimum string length and a maximum string length is specified by the user.
2. Fielding mode:
   Spatial/Layout constraints: A more detailed model for each character position in the string (mean and deviation of character size, and mean and deviation of distance to next character). This information is retrieved during the training phase.
   Field domain constraints: The set of characters/patterns that could fit at specific positions. For example we could search for a string containing only digits (012345) or a string containing three alphabetical characters at the beginning followed by three digits (LOT123). These types of domains are called static since they are set once and they never changes during the execution. An other option is to search for alternatives patterns in the same positions (i.e. strings that always start with either with "LOT" or with "STK"). This option leads to dynamic domains, since during the execution they will change depending on the character chosen at every step.
3. Verification mode:
   Spatial/Layout constraints: as with the fielding mode, a detailed model \for each character position in the string (mean and deviation of character size, and mean and deviation of distance to next character). This information is retrieved during the training phase.
   Matching Constraint: The detected string should literally match with a given input string.

Below are the descriptions of how the general algorithm adapts to each mode.

In FIG. 1, an illustration of an industrial optical character recognition is shown in a recognition mode 100. At box A, an image 110 of text is shown. At box B, character detections 120 are shown by the dots over the characters. At box C, clouds 130 are created from grouping character detections 120. C6 is indicated as the highest scored detection, which may become the root. In box D, neighbor tables are created for each cloud of clouds 130. In E, a tree structure 140 is shown where C6 is the root.

1) Recognition mode:
   I. All the candidate detections are clustered in clouds based on the distance of the candidate detections along the detected line
   II. a cloud neighbor table is created
   III. for every cloud in the line:
      a) if a cloud A has another cloud B to its right (left) within the min and max distance bounds (parameter retrieved at training time) B is added as a right (left) neighbor of A in the neighbors table,
   IV. The starting roots (starting detection candidate) are selected from the neighbor table of the cloud (we select as starting roots only the best scored detection of the Clouds with at least one neighbor)
   V. for every starting root we create a vector of possible positions of the detections in the string (since we don't know the length of the string In this recognition mode we insert all the possible position except the ones that are excluded by the configuration of the clouds: if the selected root belongs to the first cloud from the left we create just the position 0, If It's the second we create the position 0 and the position I and so on.)
   VI. for every root and for every position we generate our searching tree structure
      a) if the position is the first (last) of the string we generate one search tree with the selected root as the starting node of the right (left) search tree
      b) elsewhere we generate a left tree and a right tree starting from the selected root as starting node and we look from a partial word from the root given position to the left (left tree) and to the right (right tree)
      c) the tree is generated as following:
         1. The expand function for a given detection retrieves the next clouds from the neighbors table, that probably represents the next character of the line, if there are no more cloud in the neighbor table the next cloud on the left (right) is selected. To avoid to expand clouds that represents noise, the expansion Is stopped if the score of the next candidate cloud (i.e. best score of the detections in the cloud) is less than a dynamic threshold computed on the base of the mean score of the already explored clouds, the detections in the selected cloud are returned.
2. The explore function returns the best scored detection found in the previous expand step. If there are multiple possible choices the detection that best fits the spacing model is chosen. The other choices are remembered to rollback to, if the user has specified to explore more than one solution per search tree.
3. the rollback function returns the last unexplored best scored detection found in all the previous expansions. If there are multiple possible choices the detection that best fits the spacing model is chosen.
  d) The best scored word found from the Left tree and from the right tree are then composed together
VII. the algorithm returns the best scored string found among all the results generated by the exploration of all the hypothesis.

Figure 2:
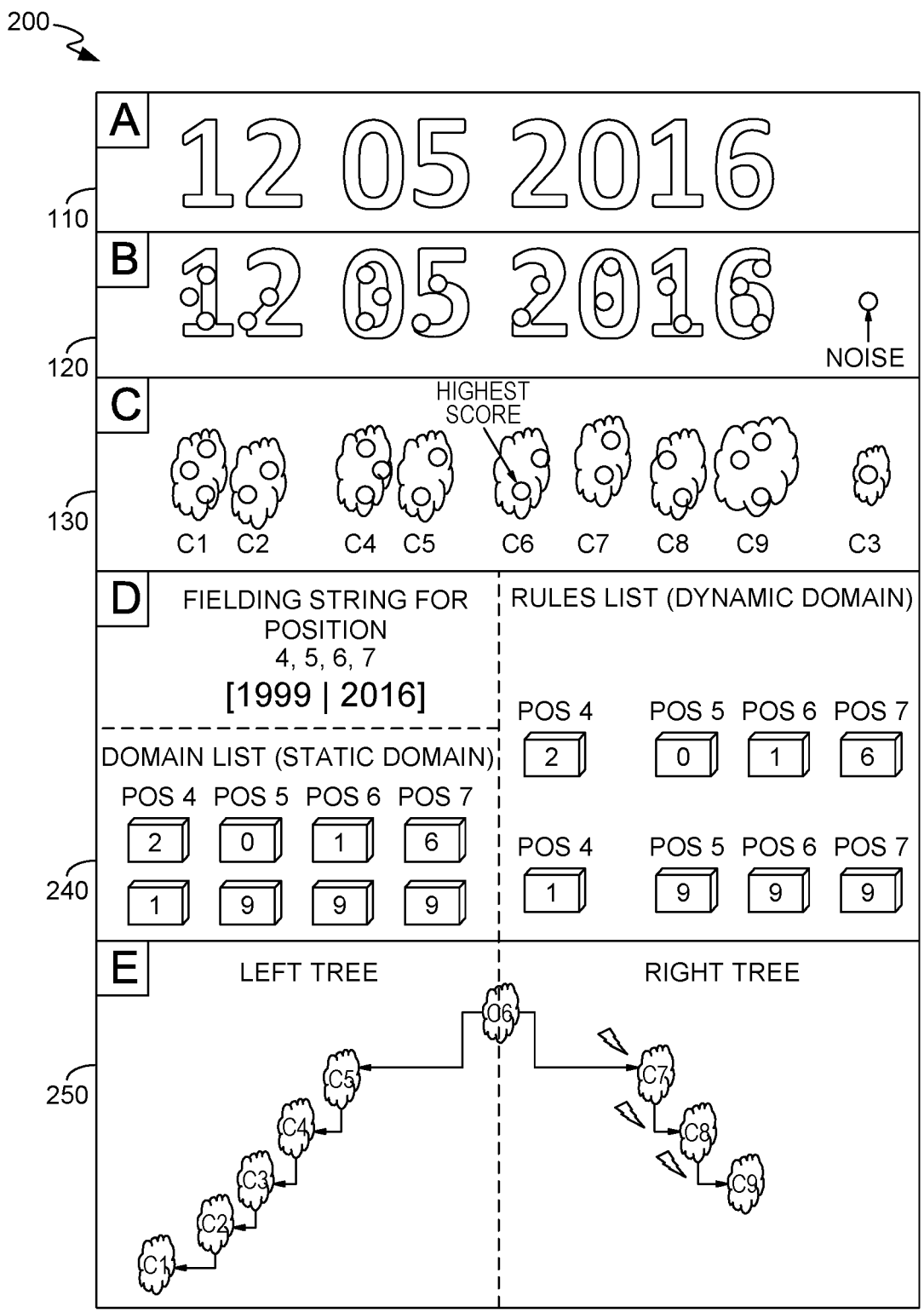
FIG. 2 is an illustration of an exemplary fielding mode, implemented in accordance with an embodiment of the present invention.

In FIG. 2, an illustration of an industrial optical character recognition is shown in a fielding mode 200. The functions of image 110, character detections 120, and clouds 130, as shown, are the same as their functions in FIG. 1. In box D, a domains 240 are created with static and dynamic domain lists. In box E, an exemplary tree 250 uses the detection highlighted in C6 as the root in position 4. In the right tree, before each assignment, the domains 240 must be checked and then updated.

2) Fielding mode:
  I. the Fielding string (the string that specifies the constraints given by the user) is parsed and a constraint model is generated. The constraint model consists of two parts:
   a) A list of domains (Static Domain) for every position in the search string (a domain is a list of possible character at a given position in the string).
   b) A list of rules for every position (Dynamic Domain). A rule is characterized by
    1. the position in the string of the current selected character (i.e. 2nd character in the string)
    2. the current selected character (i.e. "A")
    3. the rule domains (a list of possible characters for every position in the string, such as MAY**. This rule encodes that if the 2nd character is an A, the first should be an M, the 3rd a Y, and the others are arbitrary. A more complicated rule that allows both MAY, MAR, and JAN would be (JM)A{NRY}ic*)
  II. All the candidate detections are clustered in clouds based on the distance of the candidate detections along the detected line
  III. The starting roots as the best scored detection for every cloud
  IV. for every starting root we create a vector of possible positions of the detection in the string (the length of the string to detect is given by the fielding string)
  V. for every root and for every position we generate our searching tree structure
   a) if the position is the first (last) of the string we generate one search tree with the selected root as the starting node of the right (left) search tree
   b) elsewhere we generate a left tree and a tight tree starting from the selected root as starting node and we look from a partial word from the root given position to the left (left tree) and to the right (right tree)
   c) the tree is generated as following:
    1. The expand function: for a given a detection selected at the previous step, all the detections of all the clouds that fits the spacing layout for the given position are returned.
    2. The explore function returns the best scored detection, found in the last step of expansion, that matches the domain of the currently analyzed position. If there is a rule in the rules list for the given position and for the given detection, the domain of every position of the string will be updated by the correspondent rule domains (when a rule is applied to a given domain the resulting domain is the intersection of the current domain and the rule domain). If none of the detections match the current domain, the best scored one is returned—even though it doesn't match. The reason for doing this is that we can ensure we return a detected string, even if it is not completely correct. If there are multiple possible choices the detection that best fits the layout model is chosen.
    3. The rollback function returns to the best open decision point, which is the last unexplored detection with the best score that matches the domain at that decision point. If there are multiple possible choices the detection that best fits the spacing model is chosen.
   d) The best scored word found from the left tree and from the right tree are then composed together.
  VI. The best scored string (among all the results generated by the hypothesis) that fits the fielding constraints in each position is returned. If none of the words found match the fielding constraints, the best matching string generated by the exploration of all the hypothesis is returned.

Figure 3:
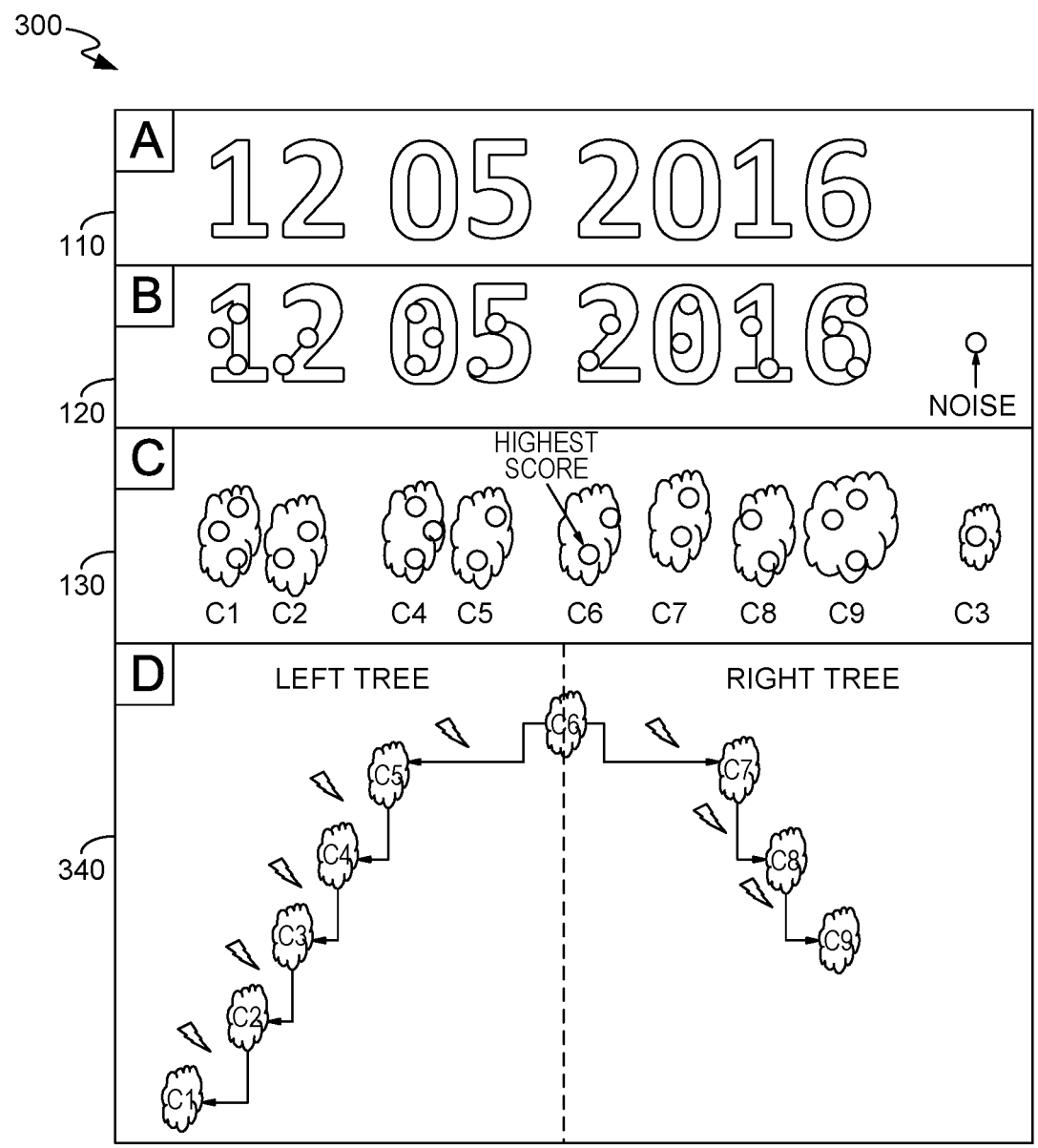
FIG. 3 is an illustration of an exemplary verification mode, implemented in accordance with an embodiment of the present invention.

In FIG. 3, an illustration of an industrial optical character recognition is shown in a verification mode 300. The functions of image 110, character detections 120, and clouds 130, as shown, are the same as their functions in FIGS. 1 and 2. In box D, an exemplary tree 340 uses the detection highlighted in C6 as the root in position 4. Before each assignment, the match with the verification string is checked.

3) Verification mode:
  I. All the candidate detections are clustered in clouds based on the distance of the candidate detections along the detected line
  II. The starting roots as the best scored detection for every cloud
  III. for every starting root we create a vector of possible positions of the detection in the string (the length of the string to detect is given by the verification string)
  IV. for every root and for every position we generate our searching tree structure
   a) if the position is the first (last) of the string we generate one search tree with the selected root as the starting node of the right (left) search tree
   b) elsewhere we generate a left tree and a right tree starting from the selected root as starting node and we look from a partial word from the root given position to the left (left tree) and to the right (right tree)

c) the tree is generated as following:
1. The expand function: for a given a detection selected at the previous step, all the detections of all the clouds that fits the spacing layout for the given position are returned.
2. The explore function returns the best scored detection that matches with the character contained in the input string at the currently analyzed position. If there are no detection that matches the given character the best scored one is returned. If there are multiple possible choices the detection that fits the more the spacing model is chosen.
3. The rollback function returns the last unexplored best scored detection, found in all the steps of expansion, that matched with the character contained In the input string at the given position. If there are no detection that matches the correct character for a position, the best scored one is returned. If there are multiple possible choices the detection that fits the more the spacing model is chosen.
d) The best scored word found from the left tree and from the right tree are then composed together.
V. The best scored string (among all the results generated by the hypothesis) is returned.

Confidence and Grade of the Result

Along with the detected string, we also return some quality measures of the result so that the end user can better decide how to use the result. The quality measures defined are the Confidence of each character in the string, and the Grade of each character. String level measures can also be defined (such as defining the string confidence as the minimum character confidence).

The Confidence is a measure for determining the probability of a detection to be selected at a certain position. The confidence of a character detection is an approximation of the probability that the chosen detection is the correct detection, given the set of possible detections for that character (at that particular position in the string). We use the following formula presented as an example of confidence:

$$C_{di} = \text{score}_{di} / ((\text{FirstBestScore}) + (\text{SecondBestScore})),$$

where $C_{di}$ is the confidence of the detection di. FirstBestScore and SecondBestScore are the two best match scored detections among the detections in the same tree-level of di (i.e., from the set of detections to choose from for the character's string position). $\text{Score}_{di}$ is the match score of the detection di. The confidence is computed during the expansion phase for all the "expanded" detections. Note that quite often scored, will be either the FirstBestScore or the SecondBestScore. Note also that an alternative definition of the confidence could have the sum of the scores for all possible detections in the denominator, but in practice we find the above formula to work better. The Confidence value is a probability between 0 and 1, and does not take into account the absolute value of the match score of a detection. A selected detection could have a high confidence, even if it had a low match score, as long as it had a higher match score than all the other candidate detections.

We use the grade to take into account, in one parameter, the confidence of a character detection and its score so that the user can apply a threshold over the results and decide to accept only results above a certain level of confidence and match score. This avoids the occurrence of False Positives, where a detection with a high confidence but low match score may otherwise be accepted. We use the following formula presented as an example of grade:

$$G_{pi} = \text{sqrt}(\text{score}_{pi} * C_{pi})$$

Having thus described the invention, what is claimed is:

1. A device for performing optical character recognition, comprising:
an image scanner configured to:
scan an image;
identify a line of text in the image from a list of peaks that represent a strong detection of characters;
categorize a cluster of peaks into a cloud, wherein the cluster of peaks is a subgroup of the peaks based on a position of the peaks;
for each cloud, locate a starting root that represents a strongest detection of possible characters;
for each root, set the root as the nth character in a string, wherein a length of the string is used to find a number of clouds in the line;
find a most likely word with the root at nth character using a left and right tree search algorithm;
select a best position of the root in the string from the n strings based on a pre-determined constraint and selection criteria; and
select the best word from a set of words generated from various starting roots.

2. The device of claim 1, wherein the peaks are candidate detections.

3. The device of claim 1, wherein the cluster is created based on a position of the subgroups of peaks.

4. The device of claim 1, wherein multiple subgroups of the peaks make up multiple clouds.

5. The device of claim 1, wherein multiple clouds form the line of text.

6. The device of claim 1, wherein the best position of the root is a best word.

7. The device of claim 1, wherein the cloud is categorized based on a distance between 1) a minimum distance so that two clusters are not considered one cloud and 2) a maximum distance.

8. The device of claim 1, wherein the image scanner is further configured to create neighbor tables for the neighbors.

9. The device of claim 1, wherein a left and right tree search algorithm is used to find words with the starting root of a strongest cloud at the nth character in the string, and the sizes of the words match a number of characters in the string.

10. A device for performing optical character recognition, comprising:
an image scanner configured to:
scan an image and recognize a list of peaks that represent a detection of characters, wherein the peaks are candidate detections for characters in a line of text;
categorize a cluster of a subgroup of peaks into a cloud, wherein the cluster is created based on a position of the subgroups of peaks, wherein multiple distinct subgroups of peaks respectively make up multiple clouds;
identify a strongest cloud, from the multiple clouds, with a strongest detection of possible characters;
group the clouds into neighbors based on a distance between two clouds;
identify a starting root in each cloud and identifies the strongest cloud as an nth character in a string, wherein each cloud represents each character in the string;
use a left and right tree search algorithm to find words with the starting root of the strongest cloud at the nth character in the string, and the sizes of the words match a number of characters in the string; and picks a best word from the words based on at least a constraint and a selection criteria.

11. The device of claim 10, wherein the multiple clouds form the line of text.

12. The device of claim 10, wherein the image scanner is further configured to create neighbor tables for the neighbors.

13. The device of claim 10, wherein the distance between the two clusters is between 1) a minimum distance so that two clusters are not considered one cloud and 2) a maximum distance.

14. A method for performing optical character recognition with an image scanner, the method comprising:
   operating the image scanner to scan an image:
   recognizing a list of peaks that represent a detection of characters within the image;
   categorizing a cluster of a subgroup of peaks into a cloud;
   identifying a strongest cloud with a strongest detection of possible characters;
   grouping the clouds into neighbors based on a distance between two clouds;
   identifying a starting root in each cloud and identifying the strongest cloud as an nth character in a string, wherein each cloud represents each character in the string;
   using a left and right tree search algorithm, finding words with the starting root of the strongest cloud at the nth character in the string, wherein a number of characters in the words match the number of characters in the string; and
   selecting a best word from the words based on at least a constraint and a selection criteria.

15. The method of claim 14, wherein the peaks are candidate detections for characters in a line of text.

16. The method of claim 14, wherein categorizing the cluster comprises creating the cluster based on a position of the subgroups of peaks.

17. The method of claim 16, wherein multiple distinct subgroups of peaks respectively make up multiple clouds.

18. The method of claim 15, wherein the multiple clouds form the line of text.

19. The method of claim 14, further comprising creating neighbor tables for the neighbors.

20. The method of claim 14, wherein categorizing the cluster comprises categorizing the cloud based on the distance between 1) a minimum distance so that two clouds are not considered one cloud and 2) a maximum distance.

* * * * *